US011416128B2

(12) United States Patent
Harmon (10) Patent No.: US 11,416,128 B2
(45) Date of Patent: Aug. 16, 2022

(54) VIRTUAL GROUP LAUGHING EXPERIENCE

(71) Applicant: VidAngel, Inc., Provo, UT (US)

(72) Inventor: Jeffrey Harmon, Provo, UT (US)

( * ) Notice: Subject to any disclaimer, the term of this patent is extended or adjusted under 35 U.S.C. 154(b) by 0 days.

(21) Appl. No.: 17/161,638

(22) Filed: Jan. 28, 2021

(65) Prior Publication Data

US 2021/0232279 A1 Jul. 29, 2021

Related U.S. Application Data

(60) Provisional application No. 62/966,642, filed on Jan. 28, 2020.

(51) Int. Cl.
*G06F 3/0484* (2022.01)
*H04M 1/72403* (2021.01)
*G06F 3/04817* (2022.01)

(52) U.S. Cl.
CPC ...... *G06F 3/0484* (2013.01); *H04M 1/72403* (2021.01); *G06F 3/04817* (2013.01)

(58) Field of Classification Search
CPC .................................................... G06F 3/0484
See application file for complete search history.

(56) References Cited

U.S. PATENT DOCUMENTS

| 2011/0179385 A1* | 7/2011 | Li ...................... G06F 16/7867 |
| | | 715/810 |
| 2017/0208362 A1* | 7/2017 | Flores ...................... H04L 65/60 |
| 2018/0124459 A1* | 5/2018 | Knox .................. H04N 21/4223 |

* cited by examiner

*Primary Examiner* — Roland J Casillas
(74) *Attorney, Agent, or Firm* — Strong & Hanni, P.C.; Joseph Shapiro (57) ABSTRACT

A collective virtual emotional experience, e.g., laughing in reaction to stand-up comedy, results is accomplished by providing stand-up comedy content through a first remote device, e.g., a smart phone, to a first content consumer; collecting, through the smart phone, the first content consumer's reaction to a segment of the stand-up comedy content; providing the same stand-up comedy content through a second remote device, e.g., a smart phone, to a second content consumer who is remote relative to the first content consumer; and, when providing the segment to the second content consumer, apprising the second content consumer of the first content consumer's reaction to the segment.

11 Claims, 11 Drawing Sheets

VIRTUAL GROUP LAUGHING EXPERIENCE

BACKGROUND OF THE INVENTION

With the advent of smart phones, connected devices, and ubiquitous connectivity, people are now able to have experiences in new settings that are more virtual and more remote. For example, people can now watch television or other media content almost anywhere using a smartphone or other portable device. People can play games (board games, video games, computer games) with others without being in the same room—or even in the same country. People can have virtual experiences, e.g., visiting a foreign country, from any location through virtual reality technology. People can communicate 24/7 across through texting and other technologies.

One experience that people enjoy is sharing emotions together. This goes for many different emotions. For example, people enjoy laughing together. There is something special about a shared laugh. In group settings, one group member's manifestation of a laugh emotion or other emotional reaction is a cue to other group members to look for and/or experience a similar reaction, e.g., cheering at a sporting event, crying at a movie, or laughing at a stand-up comedian performance. Even though the content may be identical, watching a sporting event on television does not elicit the same depth of emotion as attending the sporting with 80,000 other fans. A similar phenomenon is prevalent for crying at a movie or laughing at a stand-up comedy performance.

What is needed is a way to improve virtual experiences to simulate a group or collective emotional experience in a virtual setting.

BRIEF SUMMARY OF THE INVENTION

A server or other computing hardware or software may provide stand-up comedy content to a first user through a first remote device, e.g., through an app on a smart phone. The app may include an interface for receiving and collecting the first user's reaction to the stand-up comedy content. The app may collect the first user's real-time reaction (e.g., laughing pattern) to a segment of the stand-up comedy provided to the user, and may transmit the reaction, or data reflecting, based on, or representing the reaction, to the server.

The server may subsequently provide the same stand-up comedy content to a second user through a second remote device, e.g., through an app on a second smart phone. While providing the segment through the second remote device, the app may provide an indication based on the first user's reaction to the segment of the stand-up comedy content, and may additionally collect the second user's real-time reaction, e.g., laughing pattern, to the segment of the stand-up comedy provided to the second user, and may transmit the reaction, or date reflecting, based on, or representing the reaction to the server.

DETAILED DESCRIPTION OF THE INVENTION

This application claims priority to U.S. Provisional Application No. 62/966,642, titled "Virtual Group Laughing Experience," the first inventor of which is Jeffrey Harmon, filed on Jan. 28, 2020, and which is incorporated herein by reference in its entirety.

A system and method are disclosed for using technology, i.e., a smartphone with an app or similar computer and networking technology, to simulate a group/collective emotional experience.

TABLE OF REFERENCE NUMBERS FROM DRAWINGS

The following table is for convenience only and should not be construed to supersede any potentially inconsistent disclosure herein.

| Reference Number | Description |
| --- | --- |
| 100 | app display |
| 110 | video content |
| 112 | progress slider |
| 114 | play control |
| 116 | pause control |
| 118 | content title |
| 120 | comedian name |
| 130a-n | content segments |
| 151 | laugh control at level 1 |
| 152 | laugh control at level 2 |
| 153 | laugh control at level 3 |
| 154 | laugh control at level 4 |
| 155 | laugh control at level 5 |
| 160a-n | segment laugh metric |
| 180 | indicator of laugh level for other consumers |
| 210 | first smartphone |
| 220 | second smartphone |
| 230 | Internet (or other network) |
| 240 | server |
| 250 | third smartphone |
| 800 | flow chart for exemplary embodiment |
| 810 | step in flow chart |
| 820 | step in flow chart |
| 830 | step in flow chart |
| 840 | step in flow chart |
| 850 | step in flow chart |
| 860 | step in flow chart |
| 870 | step in flow chart |

| Reference Number | Description |
|---|---|
| 880 | step in flow chart |
| 890 | step in flow chart |

A group emotional experience may comprise cheering or booing; shock, surprise, or crying at a dramatic performance; clapping at a musical performance; laughing at a stand-up comedy performance; or any other manifestation of emotion that may be experienced or shared in a group setting.

Although many settings may provide an environment for a collective emotional experience, the disclosure herein focuses on a stand-up comedy performance or similar performance as an exemplary environment for a collective emotional experience. The disclosure herein may apply to many different environments for collective emotional experiences.

In one exemplary embodiment, as shown in FIGS. 2-7, a user may consume, i.e., watch and/or listen to, a stand-up comedy performance on a smartphone, e.g., through an app 100. As shown in FIGS. 2-7 the video for a stand-up comedy performance may be displayed in an app in video content area 110.

Figure 1A:
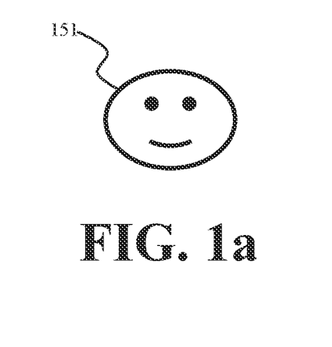
FIGS. 1*a-e* show five exemplary laugh levels that may be shown or used in an exemplary app or interface.
Figure 1B:
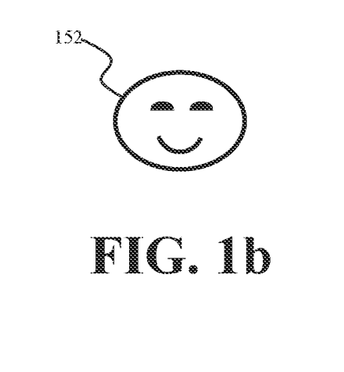
Figure 1C:
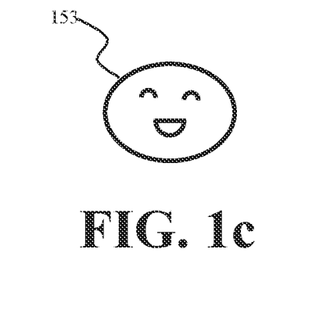
Figure 1D:
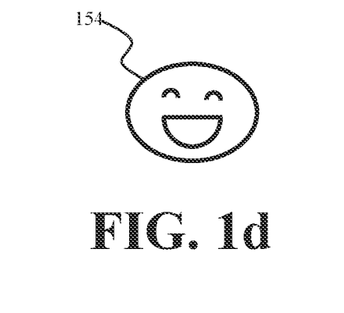
Figure 1E:
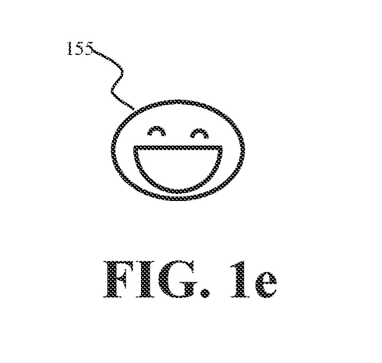
Figure 2:
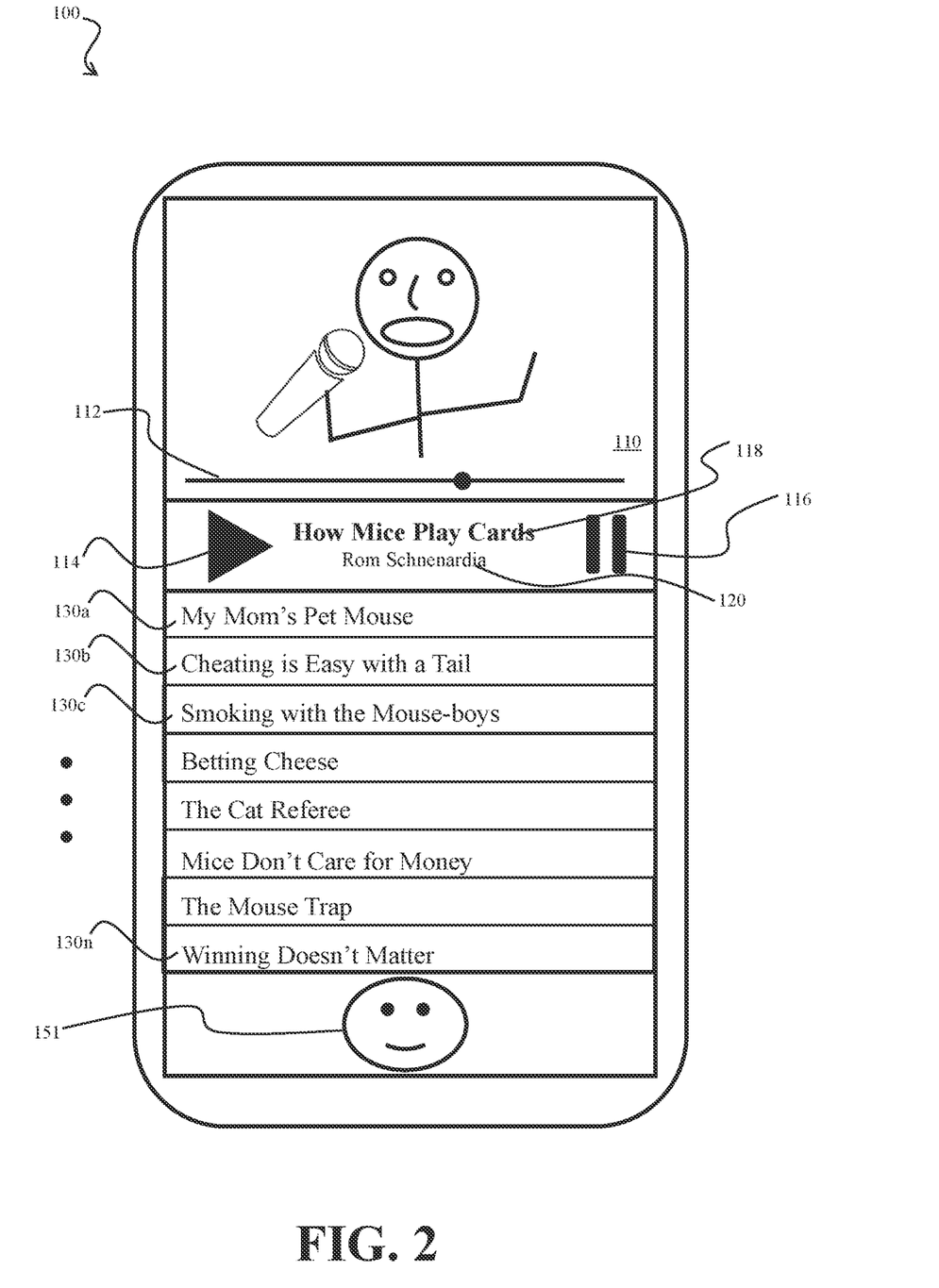
FIG. 2 illustrates an exemplary app in which the laugh control is at laugh level 1.
Figure 3:
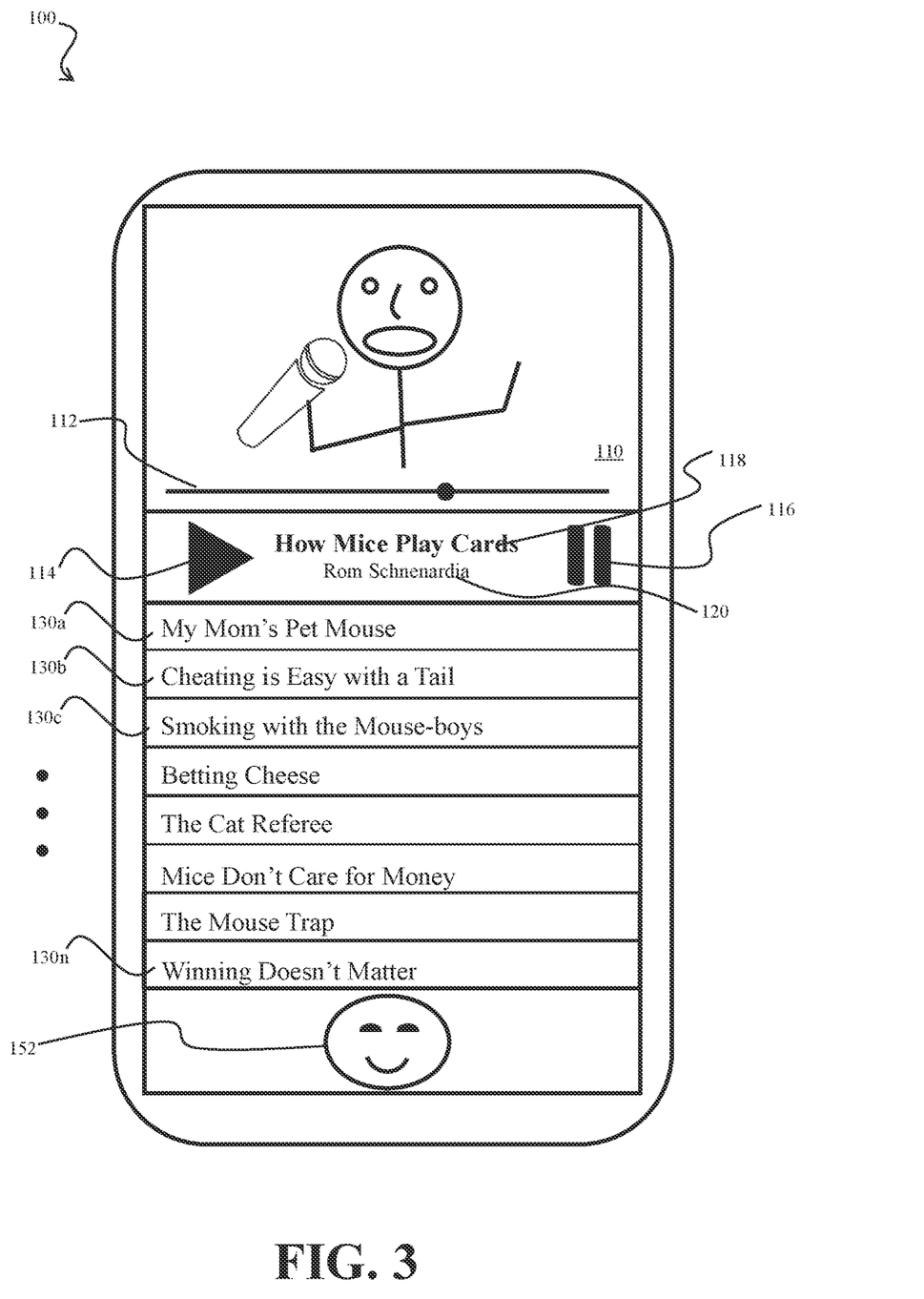
FIG. 3 illustrates an exemplary app in which the laugh control is at laugh level 2.
Figure 4:
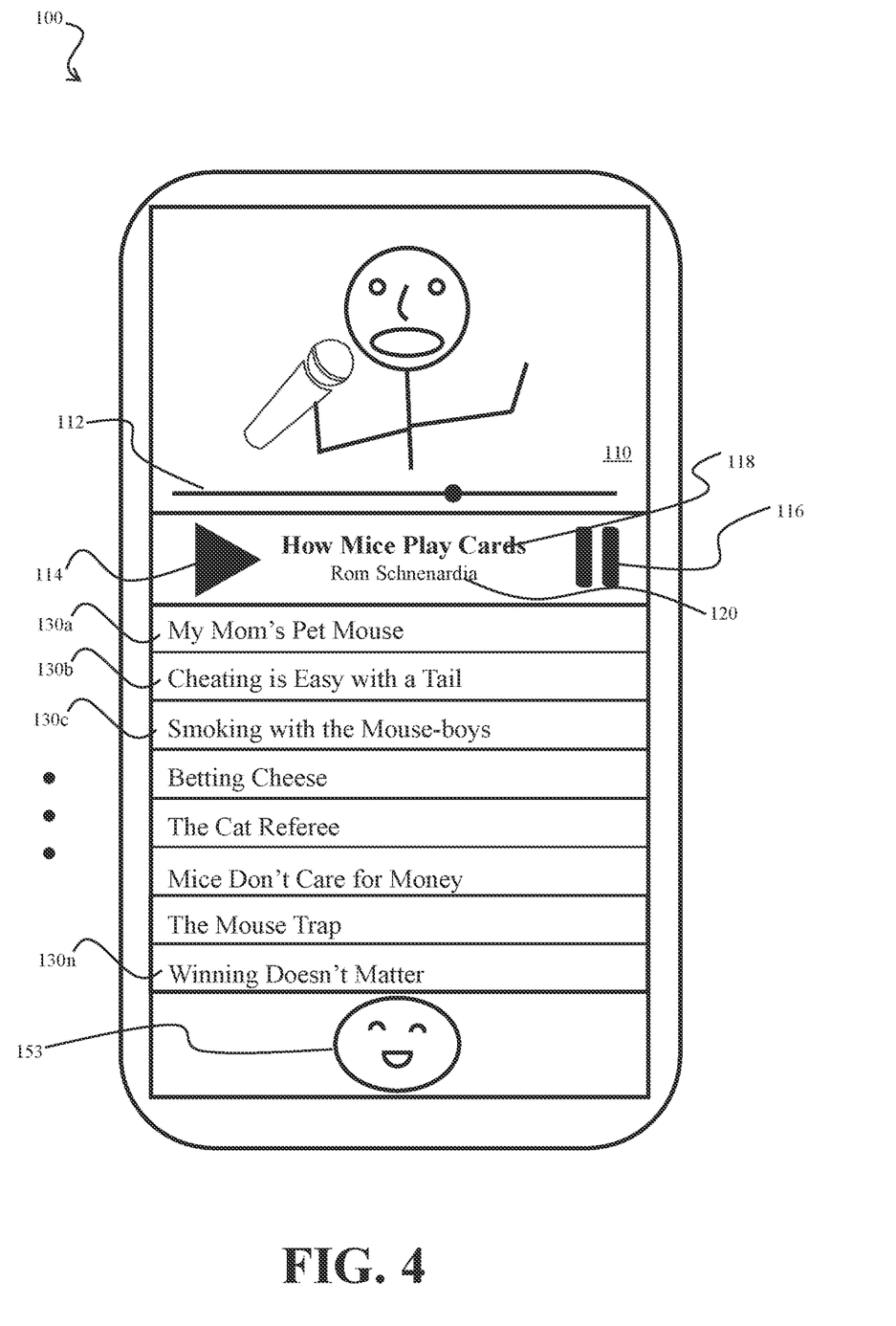
FIG. 4 illustrates an exemplary app in which the laugh control is at laugh level 3.
Figure 5:
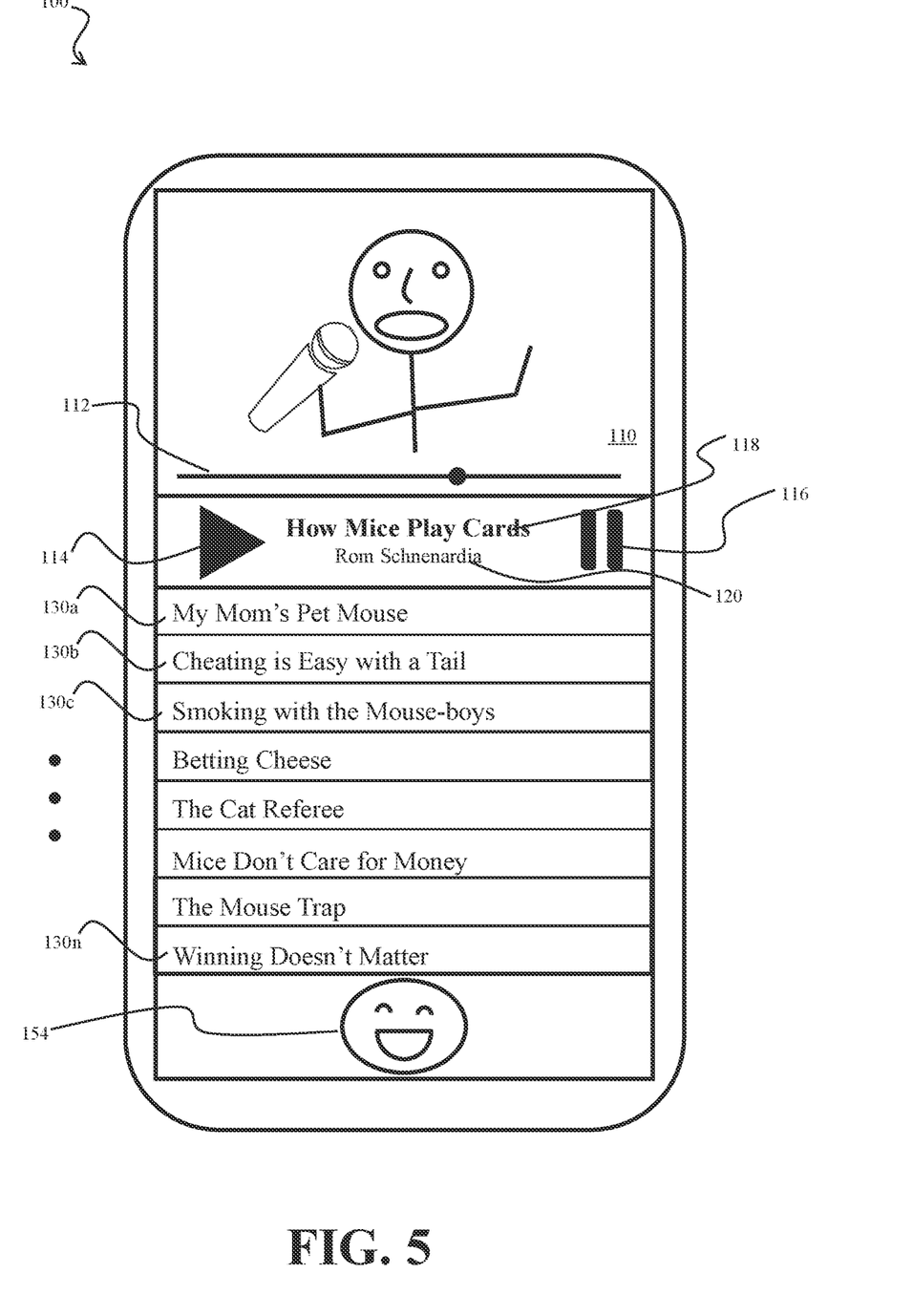
FIG. 5 illustrates an exemplary app in which the laugh control is at laugh level 4.
Figure 6:
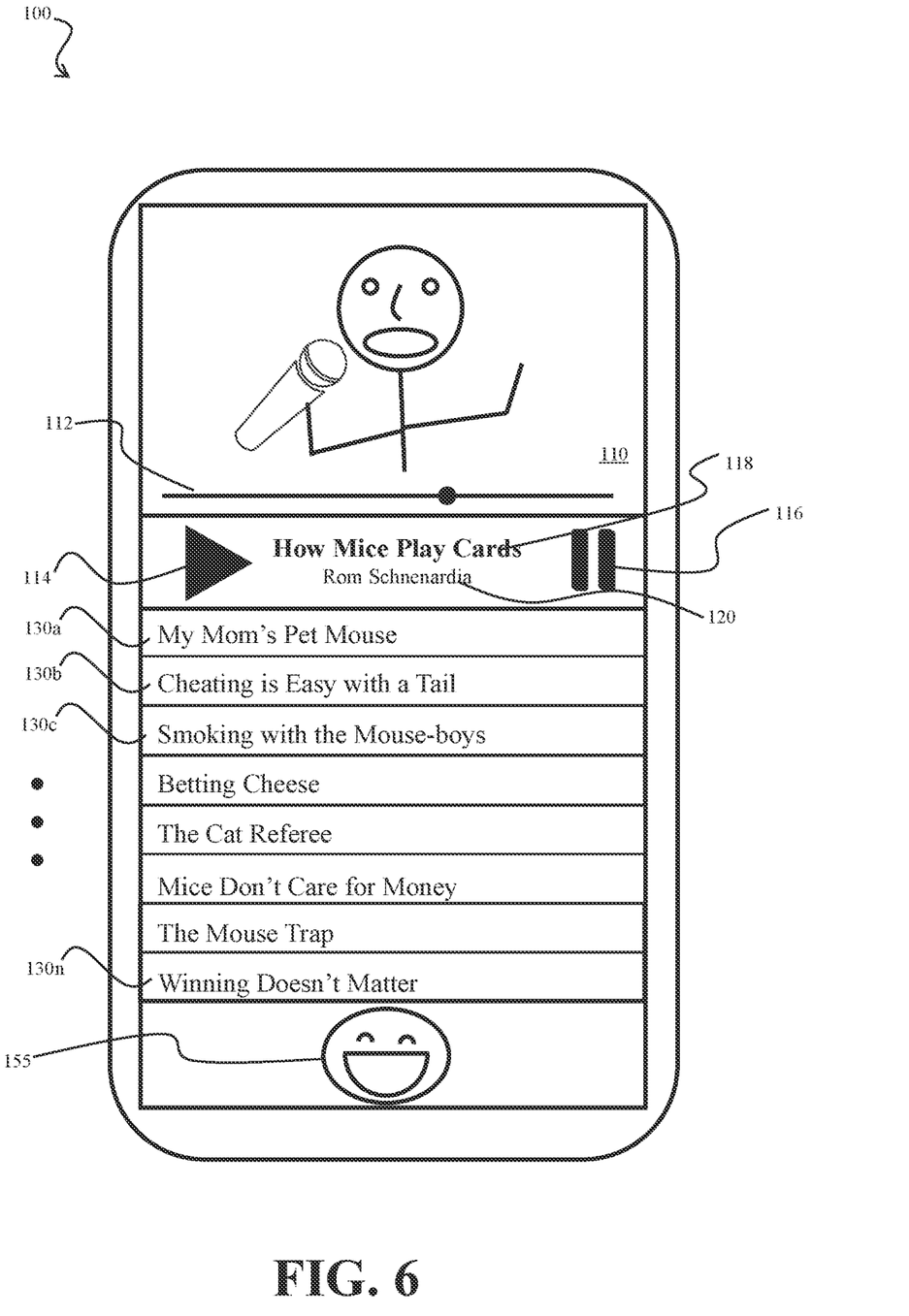
FIG. 6 illustrates an exemplary app in which the laugh control is at laugh level 5.

The app may provide a laugh control 151-155, e.g., as shown in FIGS. 1-7. Laugh control 151-155 may include functionality for the user to view/perceive, interact with, manipulate, and/or control laugh control 151-155. For example, by tapping laugh control 151-155, the user may be able to change the visual laugh representation as shown in FIGS. 2-6. FIGS. 2-6 show laugh levels 1-5, respectively, with level one 151 being the least funny (smallest smile/laugh icon) and level five 155 being the most funny (largest smile/laugh icon). FIG. 2 shows laugh control 151 in the level 1 state. FIG. 3 shows laugh control 152 in the level 2 state. FIG. 4 shows laugh control 153 in the level 3 state. FIG. 5 shows laugh control 154 in the level 4 state. FIG. 6 shows laugh control 155 in the level 5 state.

Laugh control 151-155 may escalate one level when the user taps laugh control 151-155. In some embodiments laugh control 151-155 may temporarily hover at a particular laugh level when escalated to such laugh level by a user. The hover time may be adjusted or tuned. For example, laugh control 151-155 may be configured to hover 1.0 seconds when escalated by a user, and to then automatically de-escalate if no user input is received during the hover period. Laugh control 151-155 may be further configured to de-escalate if a user taps when laugh control 151-155 is in the highest laugh level 155, and/or to de-escalate if a user's most recent tap resulted in a de-escalation. The functionality configuration for laugh control 151-155 may be modified or tuned to improve various metrics or uses. For example, the hover time may be set to track the timing of the escalation and de-escalation for a natural human laugh, such that laugh control 151-155 may more easily, accurately, and naturally track and record natural human laughing.

For example, a user consuming stand-up comedy content may interact with laugh control 110 as follows:

| Elapsed Time (s) | Laugh Control Event | Laugh State |
|---|---|---|
| 0.0 | Begin | 1 |
| 3.0 | Tap | 2 |
| 3.5 | Tap | 3 |
| 4.0 | Tap | 4 |
| 4.5 | Tap | 5 |
| 5.5 | 1.0-second hover time expired | 4 |
| 6.5 | 1.0-second hover time expired | 3 |
| 7.5 | 1.0-second hover time expired | 2 |
| 8.5 | 1.0-second hover time expired | 1 |

In the table above, the user quickly taps four times for a quick laugh, and then allows the laugh state to automatically de-escalate after the quick laugh.

The table below shows that a user may tap to escalate to for a modestly funny joke, and then tap to escalate for a sustained funny segment:

| Elapsed Time (s) | Laugh Control Event | Laugh State |
|---|---|---|
| 0.0 | begin | 1 |
| 3.0 | tap | 2 |
| 3.5 | tap | 3 |
| 4.5 | 1.0-second hover time expired | 2 |
| 5.0 | tap | 3 |
| 5.5 | tap | 4 |
| 6.0 | tap | 5 |
| 6.5 | tap | 5 |
| 7.0 | tap | 5 |
| 7.5 | tap | 5 |
| 8.0 | tap | 5 |
| 8.5 | tap | 5 |
| 9.0 | tap | 5 |
| 9.5 | tap | 5 |
| 10.0 | tap | 5 |
| 10.5 | tap | 5 |
| 11.5 | 1.0-second hover time expired | 4 |
| 12.5 | 1.0-second hover time expired | 3 |
| 13.5 | 1.0-second hover time expired | 2 |
| 14.5 | 1.0-second hover time expired | 1 |

Many different interaction configurations, schedules, algorithms, and patterns are within the scope of this disclosure.

For example, the number of laugh levels may vary, a different metric for measuring laugh level/intensity may be used, a different algorithm or control interface may be used for a user to increase or decrease the laugh level/intensity, or varying "rebound" algorithms may be used whereby a laugh control may return to anon-laughing state or decrease the laugh level/intensity automatically or in conjunction with user input/interaction with laugh control 151-155.

In another embodiment, a user may interact with a laugh control in ways other than by tapping a touchscreen control. For example, a user may use a keyboard; buttons; voice comments; shaking, moving, or otherwise manipulating a device; or in other ways known in the art for interacting with an electronic device.

In another embodiment, a user may passively interact with the laugh control. For example, a device may be equipped with a microphone and may use volume recognition and/or voice recognition to recognize the intensity of user's laugh, and may then set or adjust the laugh level/intensity based on detected laugh volume or intensity. Other embodiments may include, but are not limited to, using image recognition to analysis a user's facial features or other visual cues.

Figure 9:
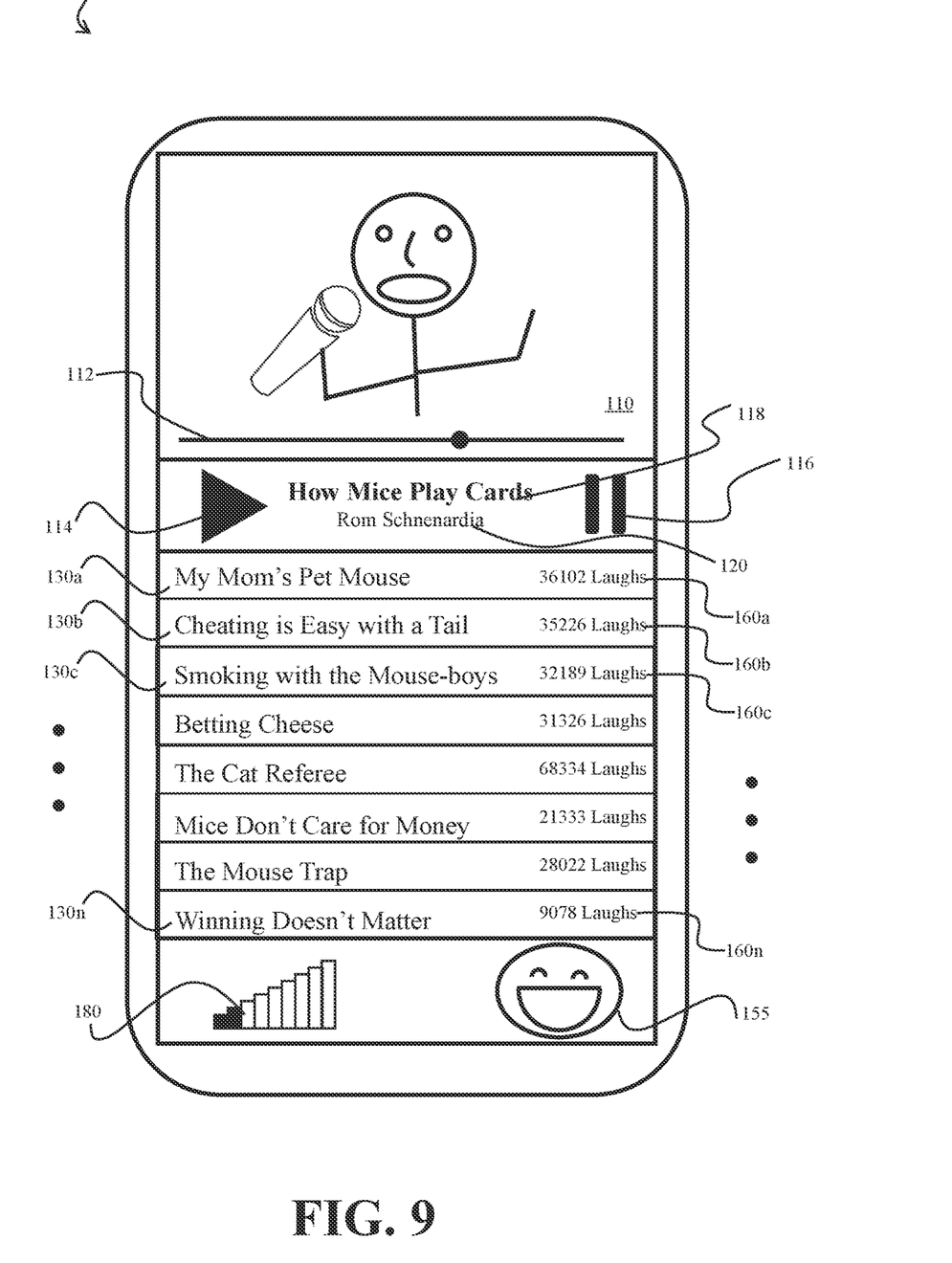
FIG. 9 illustrates use of an exemplary aggregate laugh indicator.
Figure 10:
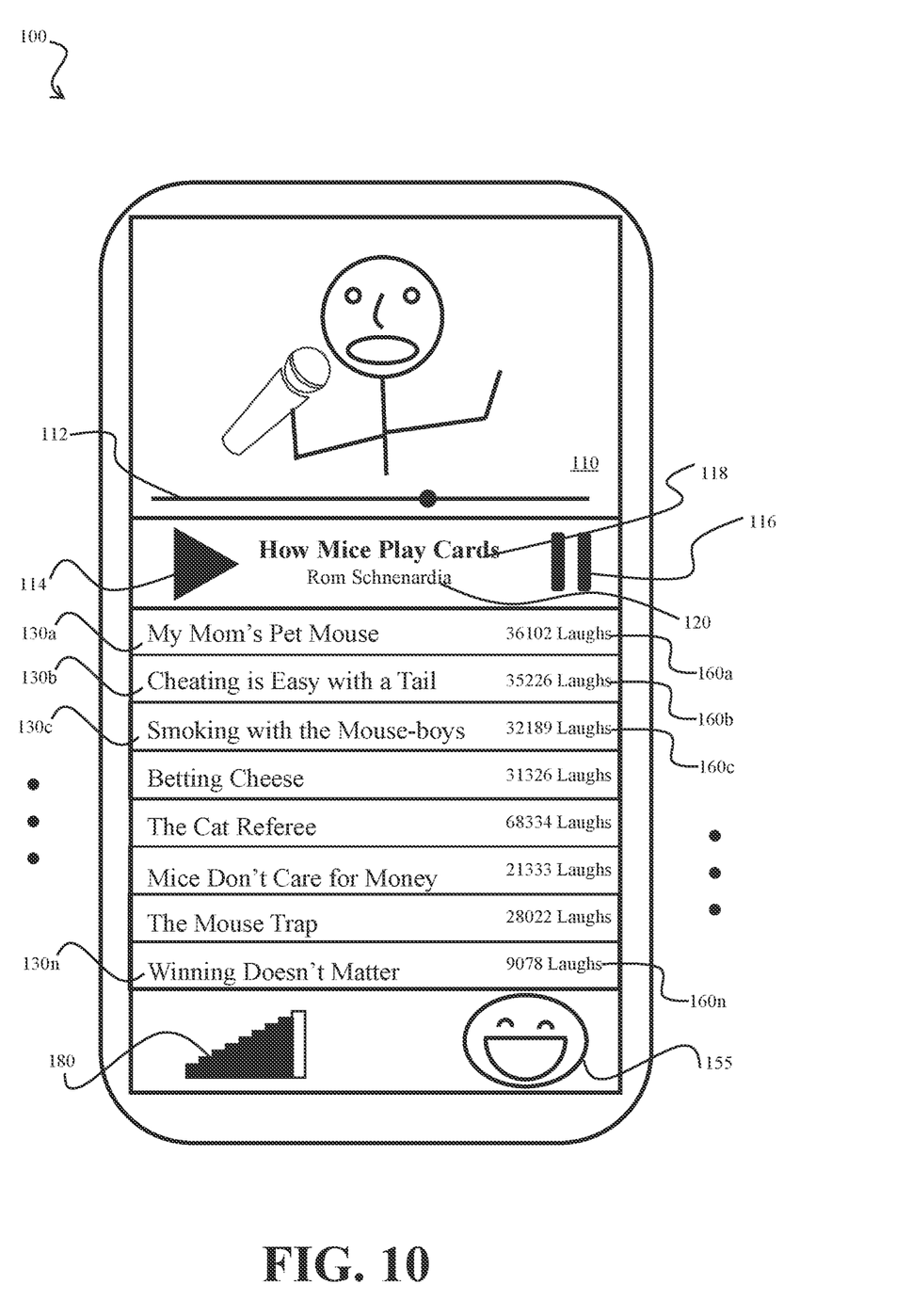
FIG. 10 illustrates use of an exemplary aggregate laugh indicator.

In one embodiment, as shown in FIGS. 9-10, app 100 may provide to user, e.g., through a visual interface, a representation 180 of an aggregate laugh intensity that is a function of the recorded laugh intensity of other users. Because laughing is often a collective or group experience, the intensity of a user's laugh is often a function of and strongly affected by the laugh intensity of other users or viewers. For this reason, to obtain accurate data, or data of improved accuracy for a user's laugh intensity, it may by beneficial to apprise the user of the laugh intensity of another or others who have consumed (e.g., watched or listened to) the same stand-up comedy content.

In one embodiment, if the stand-up comedy content was recorded in a setting with a live audience, or is being provided live (e.g., through streaming) from a setting with a live audience, then a remote user/consumer may be aware of the general laugh intensity by seeing or hearing the laughs of those in the audience. In another embodiment, the app may record the laugh of a user and may, based on the laugh intensities of one or more users, prepare an aggregate laugh track, e.g., by combining the audio of one or more remote and/or live users laughing/reacting, or by showing video of one or more remote and/or live users laughing/reacting, or by using stock laugh track recordings and selecting the recording to use based on the laugh intensity or other reaction features of one or more remote and/or live users.

In another embodiment, app 100 may provide to the user a visual representation 180 of the laugh intensity of one or more other users, e.g., through an interface element or control such as a meter, smiley face (using smiles of varying intensity), or other meter/intensity indicators as may be known in the art (e.g., color scales, dials, bars (e.g., for cell phone service), odometer/tachometer-style dial, audible noises, device vibration, screen flashing or visual patterns).

Providing to the user an indication of the laugh intensity of one or more users may induce or influence the user to laugh or otherwise react as if he/she was in the presence of other content consumers, thereby increasing the veracity and integrity of the user's laughing and/or other reactions—as if the user were in the presence of and aware of the laughing/responses of other consumers.

In some embodiments, the app may allow for filtering of others' laughing/reactions by demographics, consumption medium (e.g., live, audio only, audio/video, etc.), or other features or characteristics.

Figure 7:
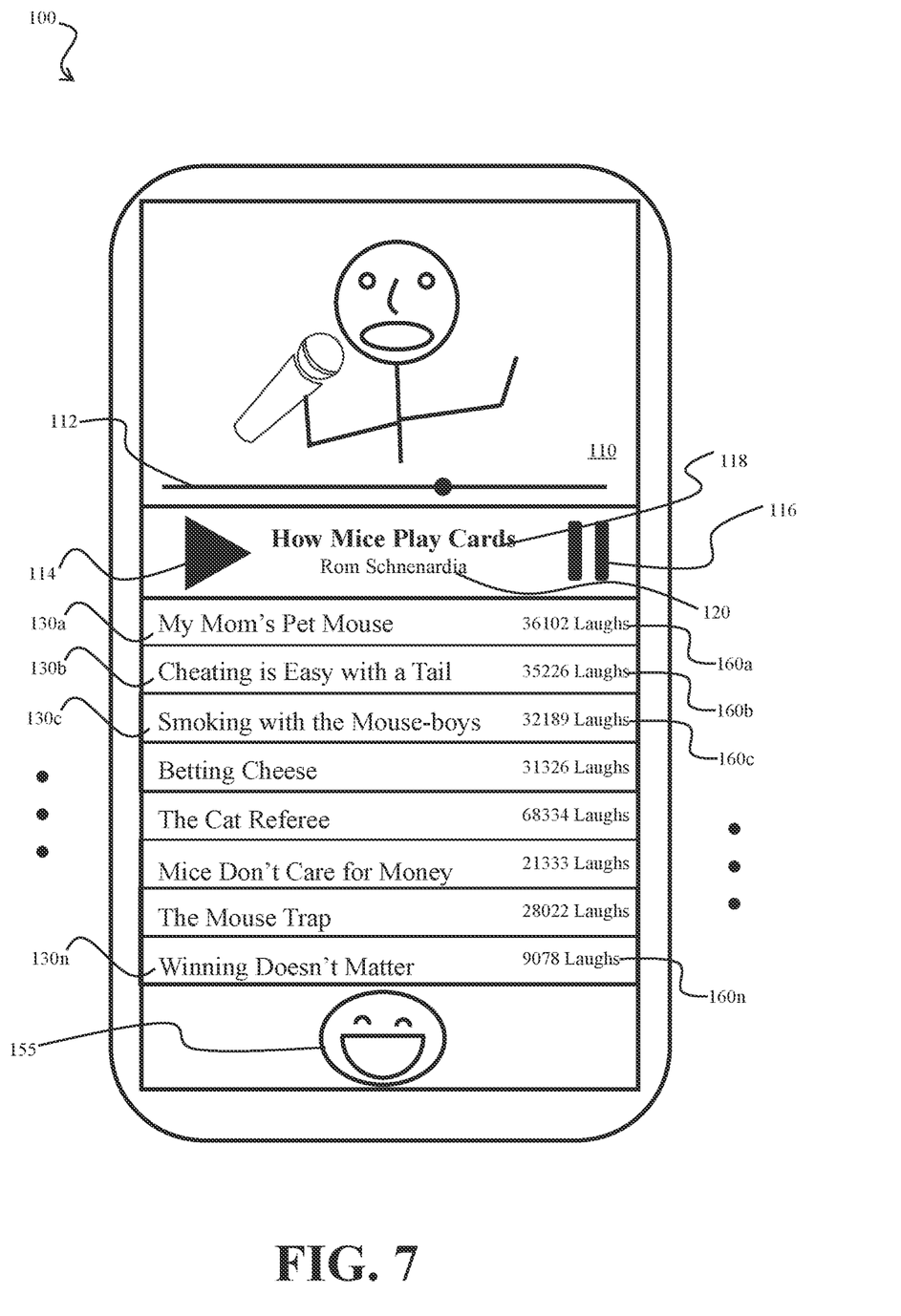
FIG. 7 illustrates an exemplary app in which a laugh metric (in this case, the number of laughs from other users) is shown for each of stand-up comedy content.

In one embodiment, as shown in FIG. 7, the app may provide to the user an indication of the laugh intensity by counting the number of laughs that other users have reported (or that have been reported based on the laugh/reaction of other users) by segment, joke, or other division or segmentation.

FIGS. 9 and 10 show an exemplary interface to providing an indication to a user of the laugh level of other consumers.

As shown in FIGS. 9 and 10, laugh level indicator 180 may provide an indication to a user of the laugh levels of others who have consumed the same content. As shown in FIGS. 9 and 10, laugh level indicator 180 may be a bar-style indicator, in which a lesser number of filled-in bars from the left indicates less laugh, and a greater number of filled in bars from the left indicates more laugh. For example, as shown in FIG. 9, laugh level indicator 180 has only the two left-most bars filled in, indicating very modest and minimal laugh level. However, as shown in FIG. 9, laugh level indicator 180 has all but one of the bars filled in, thereby indicating almost the maximum level of laugh for other users.

The laugh level indicator may comprise many different forms, e.g., a bar meter as shown in FIGS. 9 and 10, a vehicle-style speedometer meter, a sound indicator, a vibration indicator, a flashing screen, laughing sounds, a moving emoticon, or any other indicator, control, or display known in the art to indicate a measure or level of something.

The laugh level indicator may represent different metrics: average laugh level, maximum laugh level, minimum laugh level, median laugh level, $25^{th}$ percentile laugh level, $75^{th}$ percentile laugh level, laugh level over a particular subset of users (by age or other demographic, by personality style, by time of day viewed, or by any other subset or aggregation function known in the art.

Figure 8:
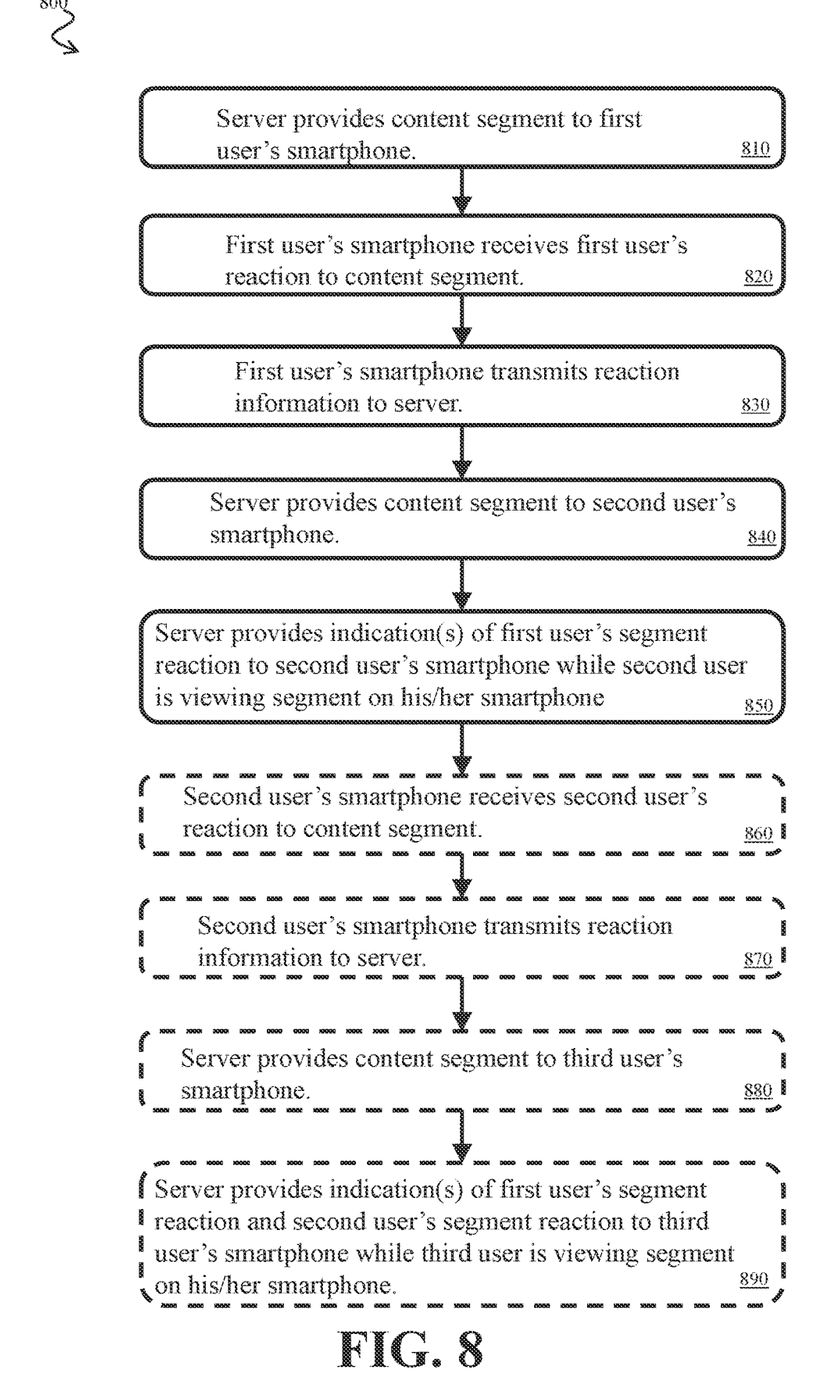
FIG. 8 illustrates an exemplary flowchart for a method disclosed herein.

FIG. 8 shows a flowchart for an exemplary method for providing a virtual collecting laughing (or other emotional experience).

At step 810, a server may provide stand-up comedy content to a first user's smartphone app. The smartphone app may include an interface for real-time collection of the first user's reaction to the content, and further include instructions to receive, collect, and transmit to the server information about the first user's real-time reaction to the stand-up comedy content, and/or to one or more segments of the stand-up comedy content.

As is well known in the art, a server may be virtual, physical, may comprise more than one piece of hardware, and may have many other implementations and still perform as a computing and/or electronic server.

At step 820, the first user's smartphone app may receive information reflecting the first user's reaction to a segment of the stand-up comedy content. As described herein above, this information may include information that the user has input, e.g., through a control or other interface, or information passively collected information such as laugh volume, words through voice recognition, smartphone movement or shaking, facial expressions, or any other information that may reflect the first user's reaction to the segment.

At step 830, the first user's smartphone app may transmit the received information about the segment to the server.

At step 840, the server may provide the stand-up comedy content to a second user's smartphone app, where the second user is remote to the first user. In addition to the features described for the first user's smartphone app, the second user's smartphone app may additionally include instructions, controls, displays, and/or interface elements to provide, to the second user, one or more indication(s) based on the first user's reaction to the segment, while the segment is being provided to the second user.

At step 850, the server may provide to the second user, through the second user's smartphone app, and while the segment is being provided to the second user, one or more indication(s) based on the first user's reaction to the segment.

Optionally, at step 860, the second user's smartphone app may receive information reflecting the second user's reaction to the segment of the stand-up comedy content.

Optionally, at step 870, the second user's smartphone app may transmit the received information about the segment to the server.

Optionally, at step 880, the server may provide the stand-up comedy content to a third-user's smartphone app, which may be identical or similar to the second user's smartphone app.

Optionally, at step 890, the server may provide to the third user, through the second user's smartphone app, and while the segment is being provided to the third user, one or more indication(s) based on the first user's and the second user's reaction to the segment.

Figure 11:
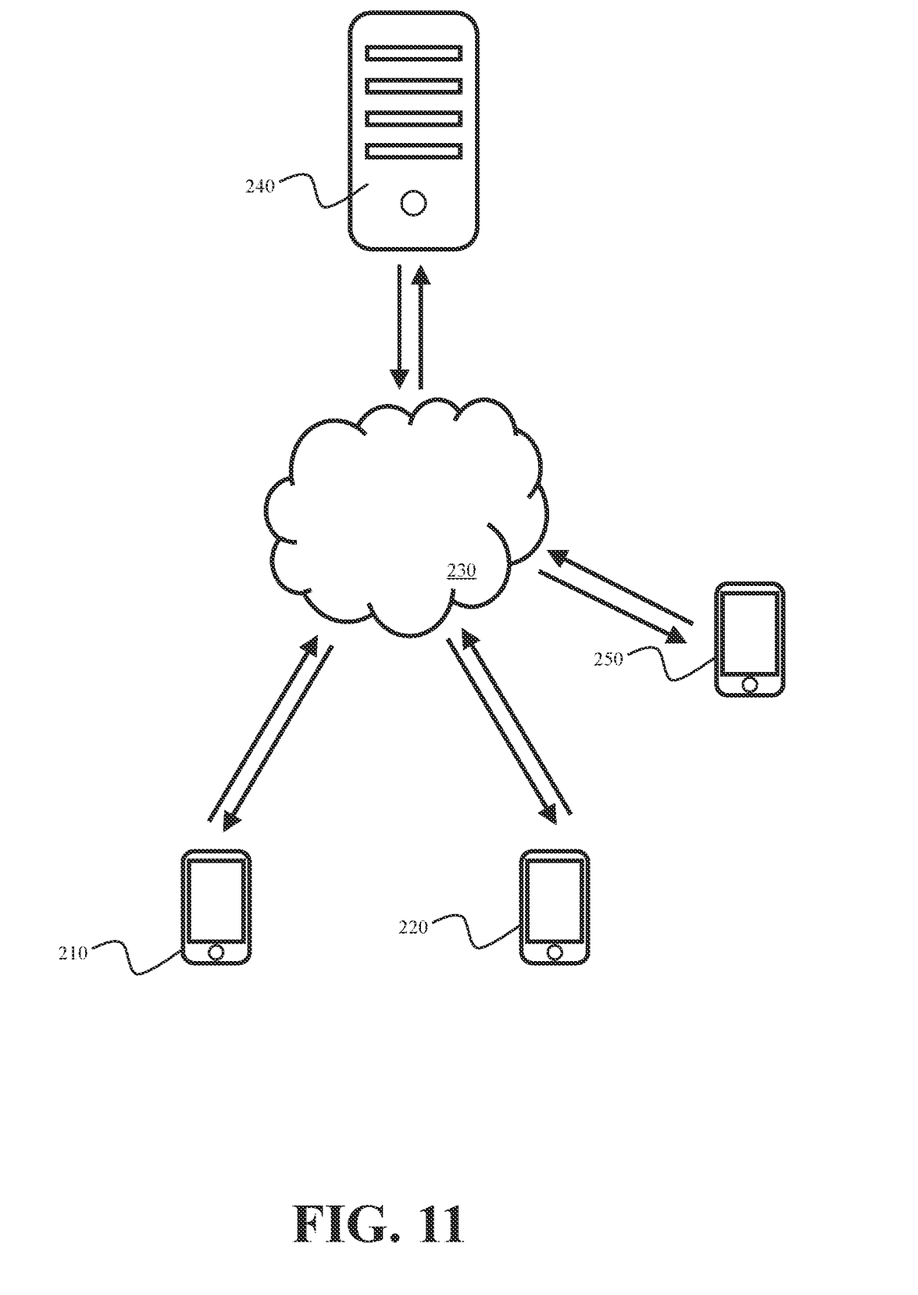
FIG. 11 shows an exemplary scheme for communication between a server and one or more smartphones or other electronic devices.

FIG. 11 shows an exemplary embodiment for communication between a server and one or more smartphones as described herein. As shown in FIG. 11, first smartphone 210 may communicate with server 240 over network 230, which may be the Internet or any other data transfer network known in the art. Second smartphone 220 may also communicate with server 240 over network 230. Third smartphone 250 may also communicate with server 240 over network 230.

A similar approach may be used to provide a virtual group experience for remote consumption of many experiences or content that has traditionally been consumed in a group setting, e.g., sporting events, dramatic performances, musical performances, movies in a movie theater (or even in home or other more intimate location), etc.

Additionally, emotions and/or reactions other than laughing or smiling are also within the scope of this disclosure. For example, the disclosure herein could apply to crying, sadness, excitement, nervousness, anger, indignation, applause, booing, cheering, and other emotions or reactions.

Additionally, although the examples and embodiments disclosed herein focus on implementation through a smart phone and app paradigm, the invention disclosed herein may be implemented through other electronic devices capable of presenting live or recorded content to a user and receiving input and/or control manipulation from a user.

What is claimed is:

1. A method for providing a virtual collective experience, comprising:
   providing content including a segment through a first remote device to a first content consumer;
   providing an interface for real-time collection of the first content consumer's reaction to the content;
   receiving, through the interface and at the time when the segment is provided to the first content consumer, information reflecting the first content consumer's reaction to the segment;
   providing the content including the segment through a second remote device to a second content consumer who is remote relative to the first content consumer; and
   when providing the segment through the second remote device to the second content consumer, providing to the second content consumer a representation based on the information reflecting the first content consumer's reaction to the segment;
   wherein:
   the interface for real-time collection of the first content consumer's reaction to the content comprises a reaction-receive interface element for receiving a degree of the first content consumer's reaction to the content; and
   information reflecting the first content consumer's reaction to the segment comprises the degree of the first content consumer's reaction to the content.

2. The method of claim 1, wherein the reaction-receive interface element comprises a degree-escalation interface element for escalating degree.

3. The method of claim 2, wherein the degree escalation interface element is configured to respond to an escalation input by hovering for a limited amount of time and then automatically de-escalating.

4. The method of claim 3, wherein automatically de-escalating comprises rebounding downward toward a default laugh level according to a rebound schedule.

5. The method of claim 1, wherein the reaction-receive interface element comprises a microphone.

6. The method of claim 1, wherein the reaction-receive interface element comprises a touch interface.

7. The method of claim 1, further comprising, in response to detecting a tap at the reaction-receive interface element, escalating the degree of the first content consumer's reaction to the content.

8. The method of claim 1, wherein providing to the second content consumer a representation based on the information reflecting the first content consumer's reaction to the segment comprises providing a visualization based on the degree of the first content consumers reaction to the segment.

9. The method of claim 1, wherein providing to the second content consumer a representation based on the information reflecting the first content consumer's reaction to the segment comprises providing an audible representation based on the degree of the first content consumer's reaction to the segment.

10. The method of claim 1, wherein the audible representation comprises a human laugh.

11. A method for providing a virtual collective laughing experience, comprising:
    providing stand-up comedy content through a first remote device;
    providing a first interface for receiving, through the first remote device, a first consumer's laugh level degree over time while consuming the stand-up comedy through the first remote device;
    receiving and storing the first consumer's laugh level degree over time;
    providing the stand-up comedy content through a second remote device;
    providing a second interface for receiving, through the second remote device, a second consumer's laugh level degree over time while consuming the stand-up comedy through the second remote device;
    receiving and storing the second consumer's laugh level degree over time;
    providing the stand-up comedy content through a third remote device;
    providing, concurrently with providing the stand-up comedy content through a third remote device, a group laugh level report based on the first consumer's laugh level degree over time and on the second consumer's laugh level degree over time;
    providing a third interface for receiving, through the third remote device, the third consumer's laugh level degree, over time while consuming the stand-up comedy through the third remote device; and
    receiving and storing the third consumer's laugh level degree over time.

* * * * *